United States Patent
Kato (10) Patent No.: US 6,810,900 B2
(45) Date of Patent: Nov. 2, 2004

(54) COMPOSITE TYPE AIR VENT VALVE OF FUEL TANK AND AIR VENT MECHANISM

(75) Inventor: Tsuyoshi Kato, Inagi (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/426,830

(22) Filed: May 1, 2003

(65) Prior Publication Data

US 2004/0011401 A1 Jan. 22, 2004

(30) Foreign Application Priority Data

Jul. 22, 2002 (JP) ........................................ 2002-212439

(51) Int. Cl.[7] ............................................. F16K 24/04
(52) U.S. Cl. .................... 137/202; 137/493.2
(58) Field of Search .............................. 137/202, 493.1, 137/493.2, 493.8, 493.9

(56) References Cited

U.S. PATENT DOCUMENTS

| 4,378,815 A | * | 4/1983 | Mochida et al. | ......... 137/493.2 |
| 6,062,250 A | * | 5/2000 | Takahashi | ................... 137/202 |
| 6,164,320 A | * | 12/2000 | Hamano et al. | ......... 137/493.2 |

* cited by examiner

Primary Examiner—Gerald A. Michalsky
(74) Attorney, Agent, or Firm—Manabu Kanesaka (57) ABSTRACT

An air vent mechanism includes a composite type air vent valve having a check valve for controlling a pressure in a fuel tank and a cut valve for discharging vapor in the fuel tank and preventing fuel from leaking. The check valve and the cut valve are connected through a communicating path. A tank side connecting portion communicates with the communicating path, and an atmosphere side connecting portion communicates with an atmosphere side port of the check valve portion.

11 Claims, 5 Drawing Sheets

COMPOSITE TYPE AIR VENT VALVE OF FUEL TANK AND AIR VENT MECHANISM

BACKGROUND OF THE INVENTION AND RELATED ART STATEMENT

The invention relates to an air vent valve in which a cut valve and a check valve are integrally formed. The cut valve normally discharges vapor in a fuel tank to a canister, and is closed to prevent fuel from leaking outside when a vehicle is turned or inclined. The check valve is provided between the cut valve and a canister to open and close for maintaining an internal pressure of the fuel tank in a predetermined range according to a pressure change in the fuel tank. The present invention also relates to an air vent mechanism of the fuel tank using the air vent valve.

Conventionally, a fuel tank of a vehicle has been provided with a cut valve for releasing an internal pressure of the tank by discharging vapor (fuel vapor) generated from fuel (gasoline) to outside the tank, and for preventing the fuel from leaking by closing the valve when the fuel liquid surface is elevated. The vapor discharged to outside the tank through the cut valve is released in the atmosphere after a hydrocarbon component is removed through a canister. Generally, a two-way valve called "check valve" is disposed between the canister and the cut valve, and is opened or closed according to the pressure change in the fuel tank to thereby maintain the internal pressure of the fuel tank in a predetermined range.

Figure 6:
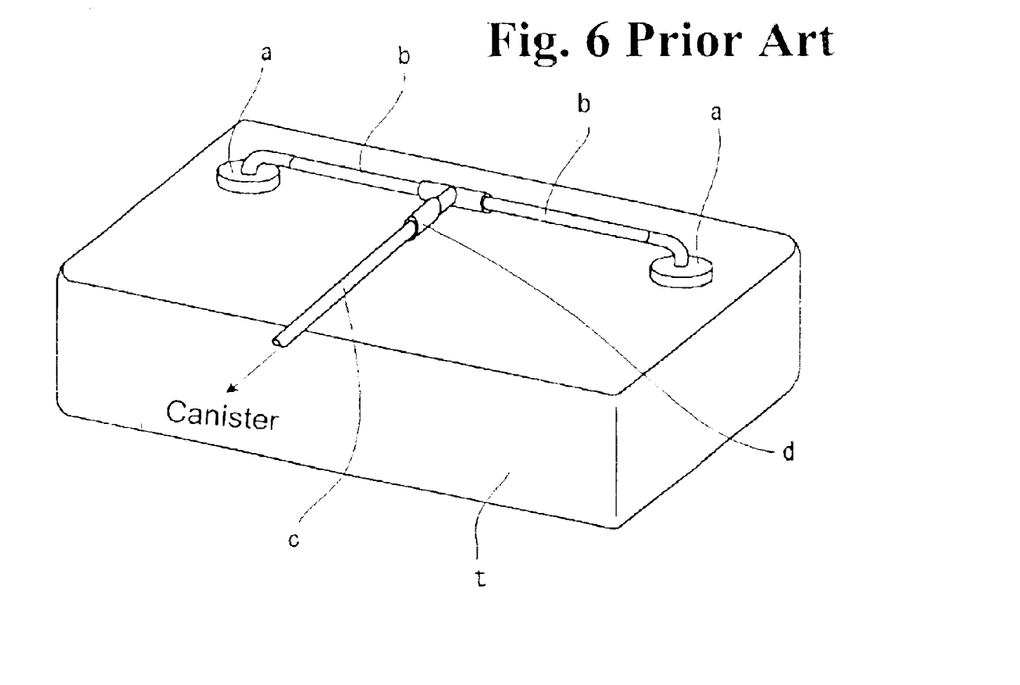
FIG. 6 is a schematic perspective view showing a conventional air vent mechanism.

A conventional air vent mechanism of the fuel tank using the cut valve and check valve is structured as shown in FIG. 6. More specifically, cut valves a are provided at positions (two positions on both sides of the tank in the drawing) on an upper wall of a fuel tank t. A pipe b is attached to each cut valve a, and is extended to form a single system air vent pipe c. The air vent pipe c is connected to the canister for guiding the vapor from the fuel tank t to the canister through the cut valves a, the pipes b and the air vent pipe c. The vapor is discharged to the atmosphere while the hydrocarbon component is removed at the canister.

In this case, the cut valves a normally discharge the vapor in the fuel tank t to outside the tank. At the same time, the cut valves a detect the fuel liquid surface, and are closed when the fuel liquid surface in the tank t is elevated, thereby preventing the fuel from leaking outside the tank t.

Also, normally, a check valve d is disposed between the cut valves a and the canister (in FIG. 6, the check valve d is located at a base end of the air vent pipe c). When the inner pressure of the fuel tank t becomes higher or lower than the predetermined levels, the check valve d is opened and releases the pressure (positive pressure or negative pressure) in the fuel tank t together with discharging the vapor.

As shown in FIG. 6, the cut valves a are provided at several positions (in the drawing, two positions) of the fuel tank t. Accordingly, when the vehicle is turned or inclined, since the fuel in the fuel tank t is one-sided, one of the cut valves a is immersed in the fuel and closed. Thus, the vapor in the fuel tank t is discharged through the other cut valve a to release the internal pressure of the tank. Incidentally, according to a shape of the fuel tank t, the cut valves may be provided at more than three positions.

However, in the conventional air vent mechanism described above, it is necessary to provide a plurality of the pipes b for connecting the cut valves a provided at the plural positions of the fuel tank t to the air vent pipe c. Also, it is necessary to provide a connector having three or four branches for fitting the pipes b to the air vent pipe c, thereby increasing the number of components constituting the air vent mechanism. Further, a large number of steps are required for assembling the pipings, connecting the respective pipings and the air vent pipe through the connectors, and installing the check valve, thereby increasing a cost.

Further, depending on a type of a car, a lay-out of the piping may be limited to minimize a space. In such a case, it may be difficult to constitute the air vent mechanism having the plural pipes b.

In view of the above problems, the present invention has been made, and an object of the invention is to provide an air vent mechanism wherein the air vent operation is reliably carried out with a simple piping, so that the mechanism can be assembled with few components and less assembly labor at a lower cost.

Further objects and advantages of the invention will be apparent from the following description of the invention.

SUMMARY OF THE INVENTION

In order to attain the above object, the present invention provides a composite type air vent valve, wherein a cut valve and a check valve are integrally combined. The cut valve normally discharges vapor in a fuel tank to outside the tank and sends the vapor to a canister. When a vehicle is turned or inclined, the valve is closed to prevent the fuel from leaking out. The check valve is disposed between the cut valve and the canister, and is opened or closed according to a pressure change in the fuel tank to maintain an inner pressure of the fuel tank in a predetermined range.

The air vent valve includes a check valve portion having a tank side port and an atmosphere side port for opening and closing between the ports as needed according to a pressure change in the fuel tank; a cut valve portion having a tank side port and an atmosphere side port so that normally the vapor in the fuel tank is discharged from the atmosphere side port to outside the tank through the tank side port in a state that both ports are communicated, and when the vehicle is turned or inclined and the fuel liquid surface is elevated, the fuel liquid surface is detected to close between the ports; an atmosphere side connecting portion communicating with the atmosphere side port of the check valve portion and connected to the canister; a communicating path for communicating the tank side port of the check valve portion with the atmosphere side port of the cut valve portion; and a tank side connecting portion for communicating with the communicating path and connected to other cut valve. The cut valve portion is attached to an upper wall of the fuel tank to cover an attaching hole in a state where the cut valve portion is projected into the fuel tank through the attaching hole.

Also, in the present invention, a plurality of cut valves is provided on an upper wall of the fuel tank and is connected to the canister for discharging the vapor in the fuel tank to outside thereof in a normal state. When the vehicle is turned or inclined, the cut valves detect a fuel liquid surface and are closed to prevent the fuel from leaking. A check valve is disposed between the cut valve and the canister to be closed or opened according to a pressure change in the fuel tank. When the fuel tank is in a pressurized state, the check valve is opened to release the vapor in the fuel tank into the atmosphere through the cut valve, the check valve and the canister in this order. When the fuel tank is in a reduced pressure state, the check valve is opened to communicate the atmosphere with the fuel tank to release the reduced pressure state. Further, the composite type air vent valve of the present invention described above is attached on the upper wall of the fuel tank as one of the cut valves and the check valve. Other cut valves are connected to the tank side connecting portion of the composite type air vent valve, and the canister is connected to the atmosphere side connecting portion.

According to the present invention, as described above, the composite type air vent valve includes the check valve portion integrally combined with the cut valve portion. The check valve portion controls the inner pressure of the fuel tank. The cut valve portion discharges the vapor in the fuel tank to outside thereof, and, at the same time, prevents the fuel from leaking. The check valve portion and the cut valve portion are connected to each other through the communicating path. The tank side connecting portion is communicated with the communicating path, and the atmosphere side connecting portion is communicated with the atmosphere side port of the check valve portion.

As in the air vent mechanism according to the present invention described above, the composite type air vent valve is attached to a predetermined position on the upper wall of the fuel tank in a state where the cut valve portion is projected into the tank as one of the cut valves and the check valve. One or more other cut valves are attached to the fuel tank and are connected to the tank side connecting portion. The atmosphere side connecting portion is connected to the canister, thereby constituting the fuel tank air vent mechanism.

Next, an operation of the air vent mechanism using the composite type air vent valve according to the present invention will be explained.

Normally, the vapor in the fuel tank is introduced into the communicating path through the cut valve portion due to the pressure increase in the fuel tank. At the same time, the vapor from the other cut valve is also introduced into the communicating path from the tank side connecting portion through the piping. The vapor flows to the atmosphere side connecting portion through the check valve portion opened by the pressure from the tank side, and is discharged into the atmosphere through the canister connected to the atmosphere side connecting portion.

Also, in the case that the fuel in the fuel tank is one-sided when the vehicle is turned or inclined, and the cut valve portion of the composite type air vent valve is immersed in the fuel, the cut valve portion detects the fuel liquid surface and closes, thereby preventing the fuel from leaking outside the tank through the cut valve portion. At this time, the vapor discharged to outside the tank from the other cut valve in an open state is introduced into the communicating path of the composite type air vent valve of the invention from the tank side connecting portion through the piping. Further, the vapor is introduced into the canister from the atmosphere side connecting portion through the check valve portion to thereby be discharged into the atmosphere. On the other hand, in the case that the vehicle is turned or inclined, the fuel in the fuel tank is one-sided to the other direction. The other cut valve is immersed into the fuel to be closed. In that case, the vapor is released into the atmosphere, in the same manner as described above, through the cut valve portion of the composite type air vent valve of the invention in the opened valve state.

Further, the check valve portion of the composite type air vent valve is normally in the closed state. However, the pressure in the fuel tank may exceed a predetermined pressure due to a large quantity of the vapor, the solar heat, vibration of the fuel tank during driving, or elevation of the fuel liquid surface through fueling. In that case, the check valve portion is opened due to the pressure so that the vapor is discharged into the atmosphere as described above. At the same time, the pressurized state in the fuel tank is released. Also, in the case that the inner pressure of the fuel tank becomes a reduced pressure state below a predetermined pressure due to cooling-down or rapid reduction of the fuel, the check valve portion is opened by the atmospheric pressure. Thus, the interior of the fuel tank is communicated with the atmosphere through the same path as described above, thereby releasing the reduced pressure condition.

Accordingly, similar to the case of the vapor discharging, even when the fuel in the tank is one-sided due to turning or inclination of the vehicle, the pressure in the tank can be securely controlled by either of the cut valve of the composite type air vent valve or the other cut valve in the opened state, thereby maintaining the inner pressure of the fuel tank at a predetermined level.

As described above, according to the invention, the composite type air vent valve has the check valve portion and the cut valve portion integrated together. The composite type air vent valve can be used as one of the cut valves, and the other cut valve is connected to the tank side connection portion. Also, the atmosphere side connecting portion is connected to the canister, thereby constituting the air vent mechanism. Therefore, it is not necessary to provide a separate-check valve, thereby reducing the number of the pipes and providing the highly reliable air vent mechanism with the simple piping and layout. The number of the components and assembly steps are reduced, thereby reducing the cost.

Therefore, according to the present invention, the composite air vent valve and air vent mechanism constitute the highly reliable air vent mechanism with less number of the components and assembly steps in a simple way at a lower cost.

DETAILED DESCRIPTION OF PREFERRED EMBODIMENTS

Hereunder, embodiments of the invention will be explained with reference to the accompanying drawings.

FIGS. 1 to 4 show a composite type air vent valve 1 of an embodiment according to the invention. The air vent valve 1 includes a case member 2, a check valve unit (check valve portion) 3 housed in the case member 2, and a cut valve unit (cut valve portion) 4 disposed at a lower end portion of the case member 2.

Figure 4:
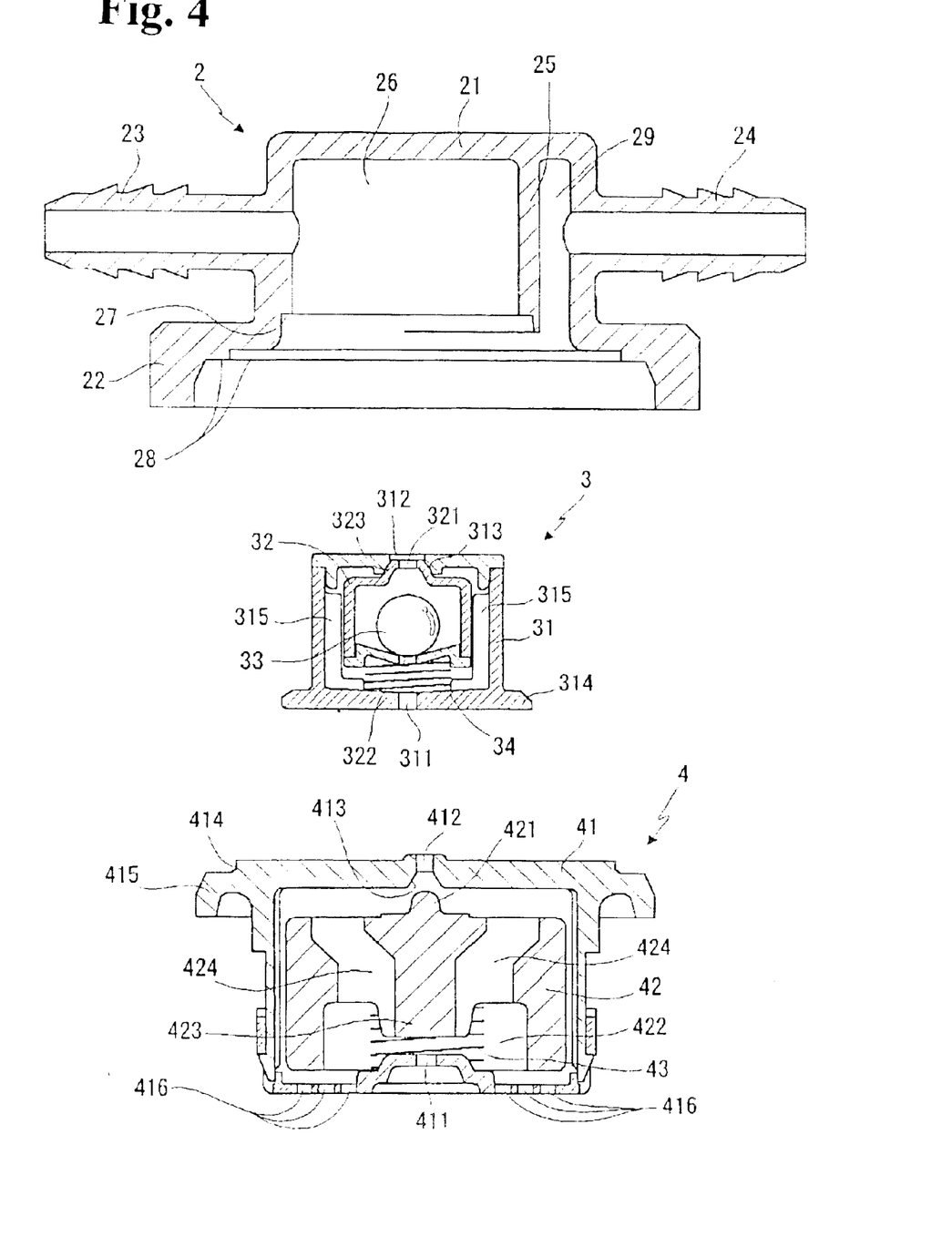
FIG. 4 is an exploded sectional view showing the air vent valve.

As shown in FIG. 4, the case member 2 is formed of a cylindrical case main portion 21 having an upper end wall, and a flange portion 22 formed at a lower end peripheral edge of the case main portion 21. Also, an atmosphere side connecting portion 23 and a tank side connecting portion 24 formed in a small diameter cylindrical shape are integrally projected from an outer surface of the peripheral wall of the case main portion 21. The atmosphere side connecting portion 23 and the tank side connecting portion 24 are communicated with a hollow portion of the case main portion 21.

In the case main portion 21, a semicircular arc shape partition 25 is integrally suspended from an upper end wall over a half of peripheral portion thereof. A valve chamber 26 having a substantially circular shape and a semicircular arc shape space 29 with a narrow width are formed between the partition 25 and an inner peripheral surface of the case main portion 21. The atmosphere side connecting portion 23 is communicated with the valve chamber 26, and the tank side connecting portion 24 is communicated with the semicircular arc shape space 29.

A step 27 is formed at a peripheral lower end of the case main portion 21 constituting the valve chamber 26 and at a lower end of the partition 25. A check valve unit 3 (described later) is fitted to the step 27. The lower surface of the flange portion 22 has an opening larger than that of the case main portion 21, and a two-stage step 28 is formed in an inner peripheral surface of the opening.

As shown in FIG. 4, the check valve unit 3 includes a cylindrical case portion 31 with closed upper and lower end walls, and a cylindrical valve member 32 with closed upper and lower ends disposed in the cylindrical case portion 31.

A tank-side entrance opening 311 is formed at the center of the lower end wall of the case portion 31. An atmosphere-side entrance opening 312 is formed at the center of the upper end wall of the case member 31. An inner peripheral surface of the atmosphere side port 312 is formed in a tapered shape to constitute a valve seat 313. A flange portion 314 to be fitted to the step 27 of the case member 2 is integrally formed at a lower end of an outer peripheral edge of the case portion 31. Four (in the drawing, only two ribs are shown) ribs 315 shifted by 90° with each other are projected on an inner peripheral surface of the case portion 31 in an axial direction.

The valve member 32 includes communicating ports 321, 322 formed at the centers of the upper and lower end walls, respectively. The central portion of the upper end wall of the valve member 32 constitutes a valve head 323 expended upward in a dome shape, and the communicating port 321 is formed at a central portion of the valve head 323. The lower end wall is formed in a funnel shape around the communicating port 322. A metal valve ball 33 is disposed in the valve member 32 to close the communicating port 322 of the lower end wall from inside by its own weight.

The valve member 32 is housed in the case portion 31 to be movable vertically guided by the four ribs. A coil spring (an urging device) 34 is disposed between the lower surface of the valve member 32 and the inner surface of the lower end of the case portion 31 for urging the valve member 32, so that the valve head 323 abuts against the valve seat 313 to close the atmosphere side port 312 in a normal state.

Figure 1:
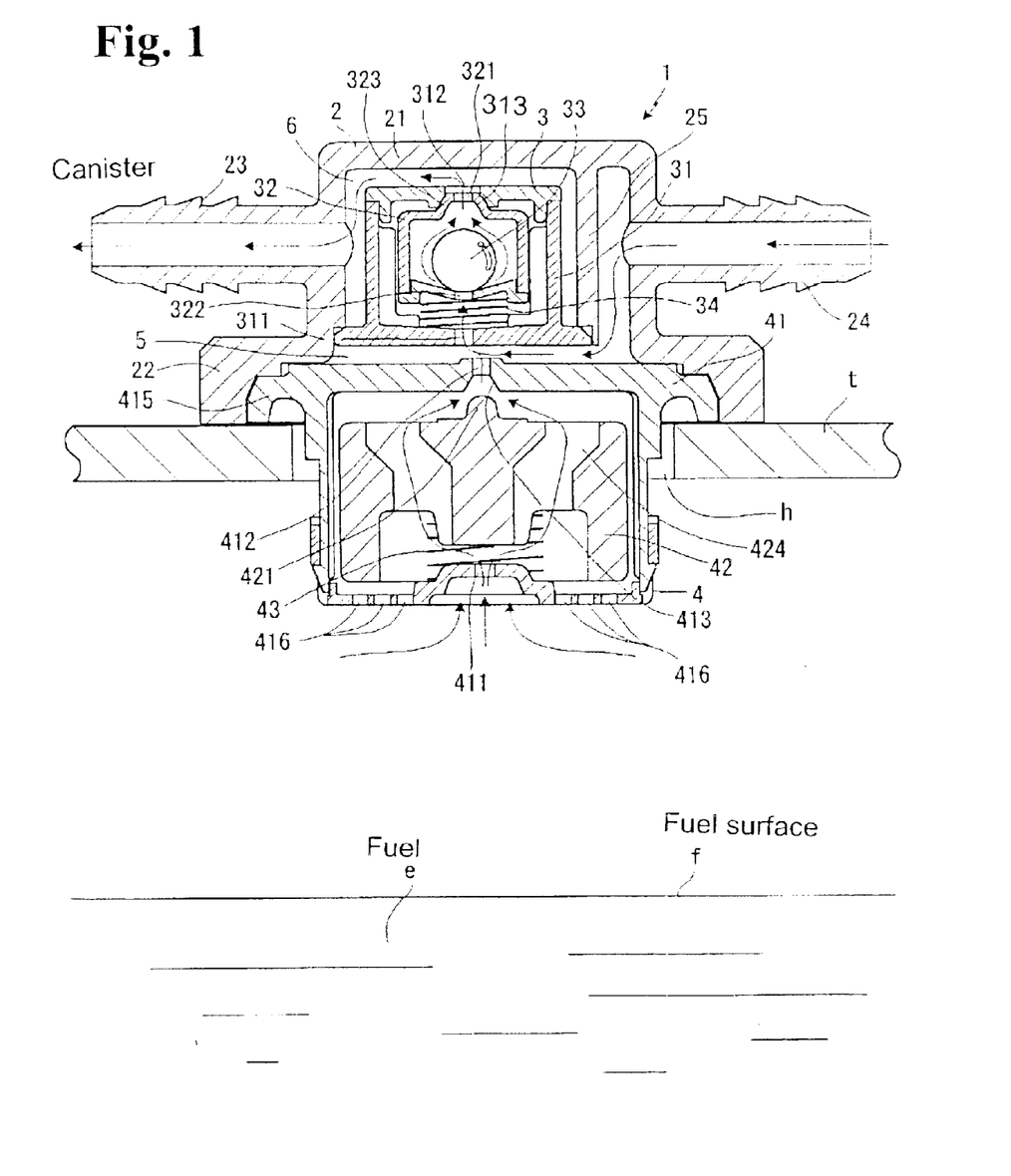
FIG. 1 is a sectional view showing an air vent valve according to an embodiment of the invention.
Figure 2:
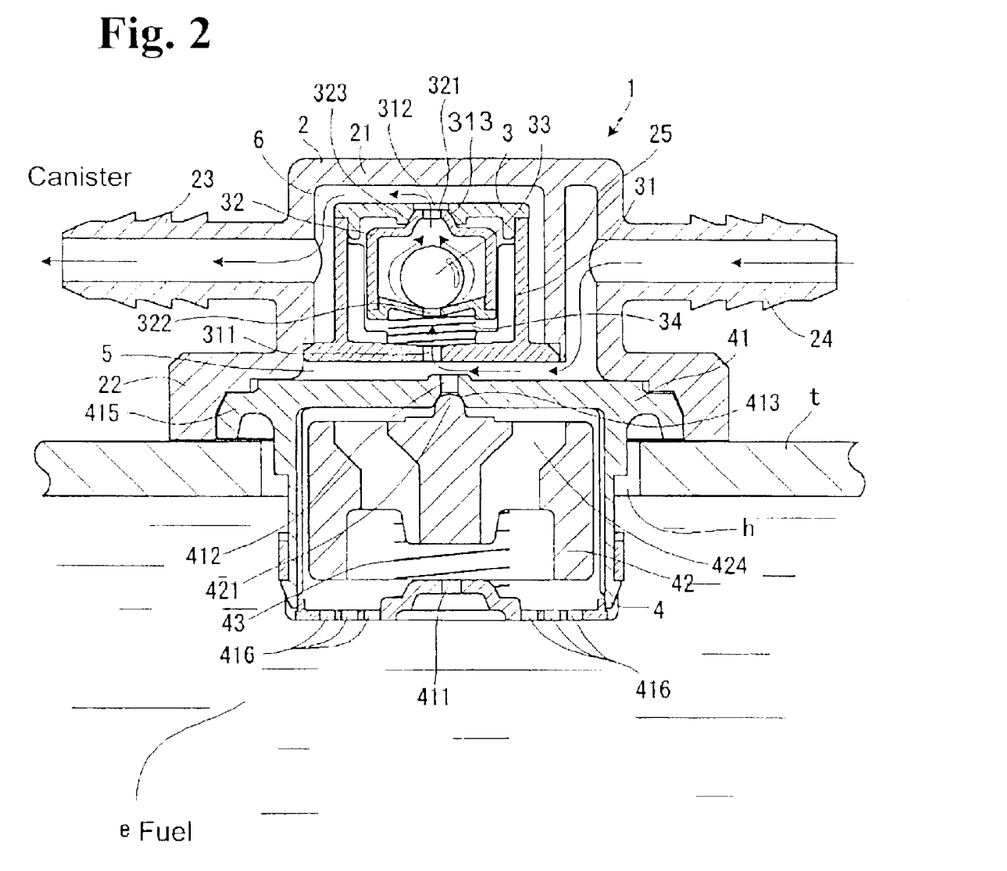
FIG. 2 is a sectional view showing a state where a cut valve portion of the air vent valve is immersed in fuel.
Figure 3:
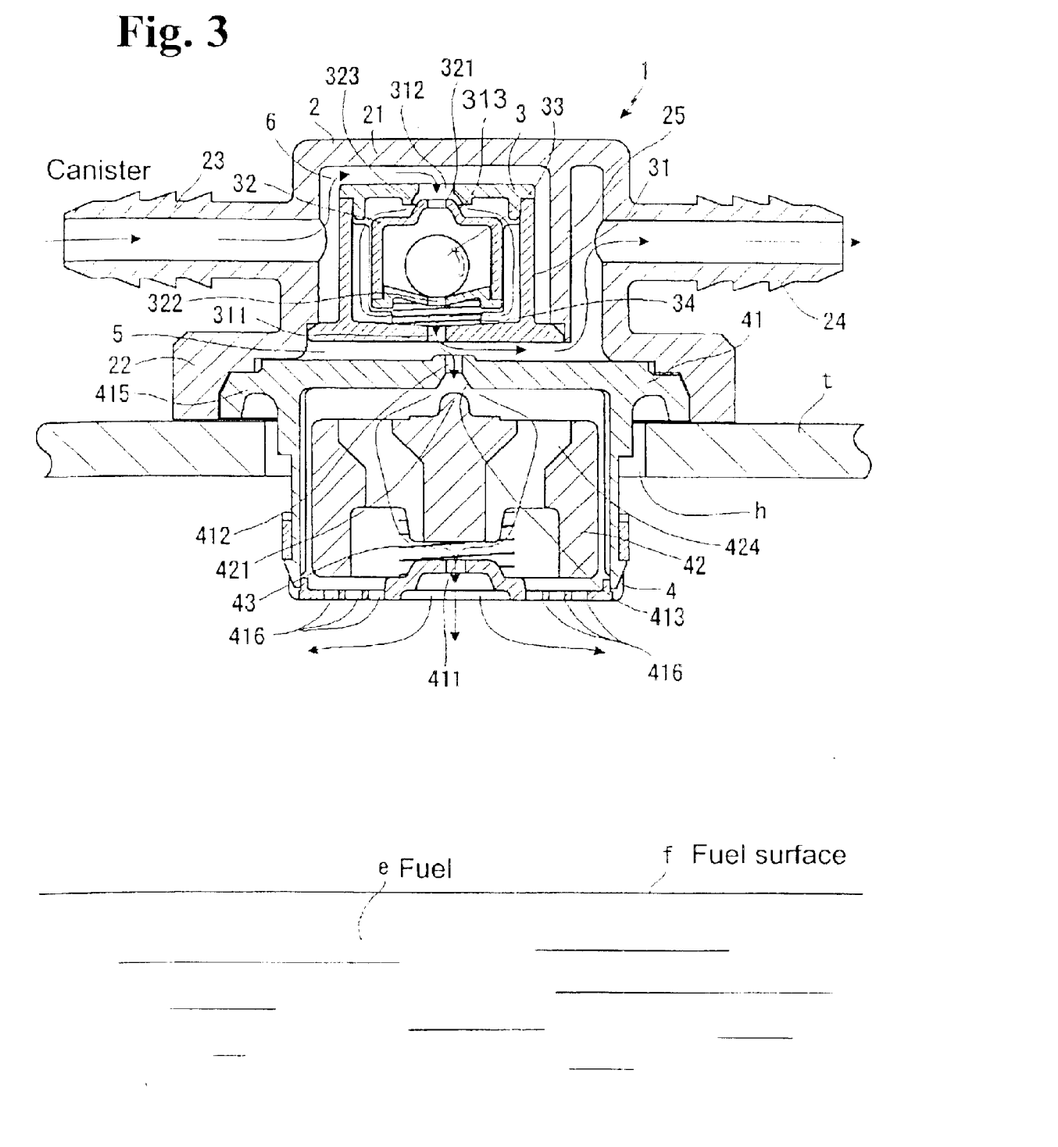
FIG. 3 is a sectional view showing the air vent valve when a reduced inner pressure in a fuel tank is released.

As shown in FIGS. 1 to 3, the check valve unit 3 is disposed in the case member 2 in a state where the case portion 31 is inserted into the valve chamber 26 (see FIG. 4) of the case member 2. The flange portion 314 (see FIG. 4) is fitted to the step 27 (see FIG. 4), and the lower end wall of the check valve unit 3 closes the lower surface of the valve chamber 26 (see FIG. 4). As shown in FIGS. 1 to 3, a predetermined space 6 is formed between the upper end surface and outer peripheral surface of the check valve unit 3 and the inner surface of the valve chamber 26 (see FIG. 4). The atmosphere side connecting portion 23 is communicated with the atmosphere side port 312 of the check valve unit 3 through the space 6. Incidentally, the flange portion 314 (see FIG. 4) and the step 27 (see FIG. 4) are normally fixed by welding.

As shown in FIG. 4, the cut valve unit 4 includes a floating member 42 disposed in a cylindrical case portion 41 with closed upper and lower ends.

A tank-side port 411 is formed at the center of the lower end of the case portion 41. An atmosphere side port 412 is formed at the center of the upper end of the case portion 41. A lower end of a peripheral wall of the tank side port 411 is bent in a step shape to protrude into the case portion 41. A central portion of the lower end of the case portion 41 is dented. An inner peripheral surface of the atmosphere side port 412 is formed in a tapered shape to constitute a valve seat 413. A flange portion 415 is integrated with an outer peripheral edge of the upper end of the case portion 41 through the step 414. A plurality of through holes 416 is formed at the lower end of the case portion 41 for guiding the fuel.

As shown in FIG. 4, the floating member 42 is formed in a short column shape, and has a valve head 421 projecting at a center of an upper surface thereof. A dent portion 422 is formed at the center of a lower surface of the floating member 42. A projected portion 423 having an inverted conical shape is formed at a central portion of an upper end surface of the dented portion 422. Further, the floating member 42 has a plurality of communicating paths 424 passing through between the dent portion 422 formed at the lower center surface of the floating member 42 and the upper end surface.

The floating member 42 is disposed in the case portion 41 to be movable vertically. When the floating member 42 is positioned at the upper moving limit, the valve head 421 abuts against the valve seat 413 to close the atmosphere side port 412 of the case portion 41. The floating member 42 is normally positioned at the lower moving limit, as shown in FIG. 4, and the valve head 421 is separated from the valve seat 413 to open the atmosphere side port 412. When the fuel enters the case portion 41 from the through holes 416, the floating member 42 is floated to close the atmosphere side port 412. In this case, a coil spring 43 is provided between the dent portion 422 of the floating member 42 and the inner surface of the lower end wall of the case portion 41 for allowing the floating member 42 to float smoothly.

As shown in FIGS. 1–3, the flange portion 415 (see FIG. 4) of the cut valve unit 4 is inserted into the lower end opening of the case member 2. The flange portion 415 (see FIG. 4) and step 414 (see FIG. 4) are fitted to the step 28 (see FIG. 4) of the case member 2. The upper end wall of the cut valve unit 4 closes the lower end opening of the case member 2, so that the cut valve unit 4 is fixed to the lower surface of the case member 2 in a state projecting downward from the lower surface thereof.

As shown in FIGS. 1–3, a space communicating with the circular arc space 29 (see FIG. 4) of the case member 2 is formed between the upper end surface of the cut valve unit 4 and the lower end surface of the check valve unit 3. The space and the semicircular arc space 29 (see FIG. 4) constitute a communicating path 5. The atmosphere side port 412 of the cut valve unit 4 is communicated with the tank side port 311 of the check valve unit 3 through the communicating path 5. The tank side connecting portion 24 is communicated with the tank side port 311 of the check valve unit 3 through the communicating path 5.

The case member 2, the check valve unit 3 and the cut valve unit 4 can be formed of a synthetic resin, such as polyacetal (POM), polybutylenetelephthalate (PBT), polyphenylenesulfide (PPS), liquid crystal polymer (LCP), polyamide (PA), polyethylene (PE), a mixture of PA and PE, and a mixture of ethylenevinylalcohol (EVOH) and PE. The case member 2 and the cut valve unit 4 are welded to close the attaching hole h provided on an upper wall of the fuel tank t. Therefore, PE and the like can be preferably used with respect to the welding property. In order to prevent the permeating vapor, the mixture of PA and PE or the mixture of EVOH and PE with a good gas barrier property can be preferably used. Further, in a view of the welding property and the gas barrier property, the case member 2 and the cut valve unit 4 may be formed in molded products having a two-layer structure using a two-material molding method.

As shown in FIGS. 1–3, the cut valve unit 4 projecting from the lower surface of the case member 2 is inserted into the attaching hole h formed on the upper wall of the fuel tank t. The flange portions 22, 415 of the case member 2 and the cut valve unit 4 close the attaching hole h from the outside in a state where the cut valve unit 4 is projected into the fuel tank t. The lower surfaces of the flanges 22, 415 are welded to the upper wall of the fuel tank t, thereby fixing the flange portions 22, 415 to the fuel tank t. Accordingly, the air vent valve 1 is fixed to the fuel tank t.

Figure 5:
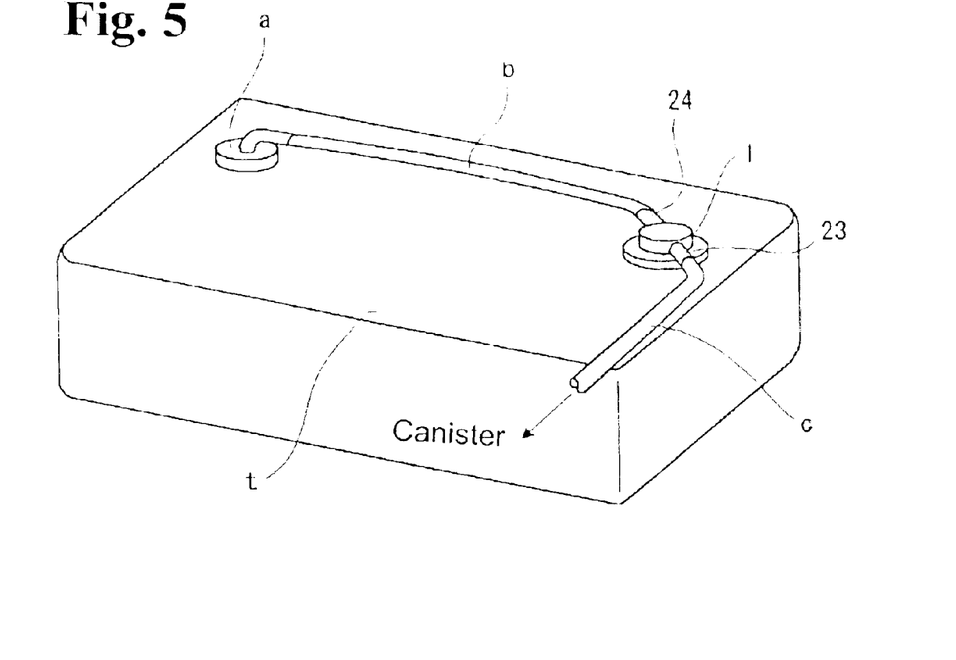
FIG. 5 is a schematic perspective view showing an example of an air vent mechanism of the invention using the air vent valve.

As shown in FIG. 5, the tank side connecting portion 24 of the air vent valve 1 is connected to the tank t through the other cut valve a attached to the fuel tank t and piping b. The atmosphere side connecting portion 23 is connected to the canister through an air vent pipe c to thereby constitute the air vent mechanism of the fuel tank t. The other cut valve a may have the same structure as that of the cut valve unit 4 for constituting the present air vent valve 1, or may have the other structure. Incidentally, in a case that the other cut valve a has the structure same as that of the cut valve unit 4, the components can be standardized to thereby reduce the cost.

The air vent operation of the air vent mechanism using the air vent valve 1 is carried out as follows.

Normally, as shown by arrows in FIG. 1, the vapor in the fuel tank t flows into the air vent valve 1 from the tank side port 411 of the cut valve unit 4 due to the pressure increase in the fuel tank t. The vapor is introduced into the communicating path 5 through the communicating paths 424 formed in the floating member 4 and the atmosphere side port 412 of the cut valve unit 4. The vapor from the other cut valve a (see FIG. 5) is also introduced into the communicating path 5 from the tank side connecting portion 24 through the piping b (see FIG. 5).

At this time, due to the pressure from the tank side, a space (not shown) is created between the valve ball 33 disposed in the valve member 32 of the check valve unit 3 and the communicating port 322 formed at the lower end wall of the valve member 32. The vapor introduced into the communicating path 5 flows into the atmosphere side connecting portion 23 from the space 6 formed between the check valve unit 3 and the inner surface of the valve chamber 26 (see FIG. 4) of the case member 2 through the tank side port 311 of the check valve unit 3, the communicating port 322 at the lower end wall of the valve member 32, the communicating port 321 at the upper end wall of the valve member 32 and the atmosphere side port 312 of the check valve unit 3. The vapor is then discharged into the atmosphere from the canister connected to the atmosphere side connecting portion 23 through the air vent pipe c (see FIG. 5).

In the case that the fuel in the fuel tank t is one-sided when the car is turned or inclined, the cut valve unit 4 of the present air vent valve 1 is immersed in the fuel e, as shown in FIG. 2. The fuel e enters the cut valve unit 4 through the through-holes 416 and the tank side port 411, and the floating member 42 is floated. The valve head 421 of the floating member 42 abuts against the valve seat 413 to thereby close the atmosphere side port 412 of the cut valve unit 4. Therefore, the cut valve unit 4 is closed, and the fuel e can be prevented from leaking out outside the tank t. At this time, the vapor discharged outside the fuel tank t through the other cut valve a (see FIG. 5) in an open state is introduced into the communicating path 5 of the present air vent valve 1 from the tank side connecting portion 24 through the piping b (see FIG. 5) in the same manner as described above. Then, the vapor is introduced into the canister from the atmosphere side connecting port 23 through the check valve unit 3 to be discharged into the atmosphere.

On the other hand, in the case that the fuel e in the fuel tank t is one-sided in the other direction when the car is turned or inclined, the other cut valve a (see FIG. 5) is immersed in the fuel e to thereby close. The vapor is discharged into the atmosphere, in the same manner as shown in FIG. 1, from the cut valve unit 4 of the present air vent valve 1 in the open state.

The cut valve unit 4 of the present air vent valve 1 is normally in the closed state, as described above. The inner pressure of the fuel tank t exceeds a predetermined pressure when a large quantity of vapor is generated, the car is heated by sun, the fuel tank vibrates during driving, or the fuel liquid surface rises upon fueling. In such a case, a space is created between the valve ball 33 disposed in the valve member 32 of the check valve unit 3 and the communicating port 322 formed on the lower end wall of the valve member 32. Thus, the cut valve unit 4 is opened, so that the vapor is discharged into atmosphere as described above, thereby releasing the increased pressure in the fuel tank t.

In the case that the inner pressure of the fuel tank t becomes below a predetermined pressure due to cool-down or rapid decrease in the fuel, as shown in FIG. 3, the valve member 32 of the check valve unit 3 is moved downward by the atmospheric pressure against the urging force of the coil spring 34. The valve head 323 of the valve member 32 is separated from the valve seat 313, and the atmosphere side port 312 of the check valve unit 3 opens, so that the atmosphere side port 312 of the check valve unit 3 is communicated with the tank side port 311. Therefore, the interior of the fuel tank t is communicated with the atmosphere through the canister, the air vent pipe c (see FIG. 5), the atmosphere side connecting portion 23, the space 6, the check valve unit 3 in the open state, the communicating path 5, and the cut valve unit 4 in the opened state. The interior of the fuel tank t is also communicated with the atmosphere in the path through the tank side connecting portion 24 communicated with the communicating path 5, the piping b (see FIG. 5), and the other cut valve a in the open state. Thus, as shown by the arrows in FIG. 3, the atmosphere is introduced into the fuel tank t, thereby releasing the reduced pressure in the fuel tank t.

Similar to the case of the vapor discharge described above, the inner pressure of the fuel tank t can be securely controlled through either the cut valve unit 4 of the present air vent valve 1 in the opened state or the other cut valve a (refer to FIG. 5) even if the fuel e in the fuel tank t is one-sided when the car is turned or inclined. Thus, it is possible to maintain the inner pressure of the fuel tank t at a predetermined pressure.

As described above, according to the composite type air vent valve 1 of the present embodiment, the check valve unit (check valve portion) 3 and the cut valve unit (cut valve portion) 4 are integrated. Therefore, as shown in FIG. 5, the composite type air vent valve can be used as one of the cut valves. In this case, the other cut valve a is connected to the tank side connecting portion 24, and the atmosphere side connecting portion 23 is connected to the canister, thereby constituting the air vent mechanism. Thus, it is not necessary to provide a separate check valve. As shown in FIG. 6, when comparing with the conventional air vent mechanism, the number of the piping b can be reduced, thereby constituting the air vent mechanism with a simple piping layout and high reliability. Also, in the present invention, the number of the components as well as the assembling steps can be reduced, thereby reducing the cost.

Therefore, according to the air vent valve 1 and the air vent mechanism of the invention, the air vent mechanism with the simple piping performs the reliable air vent operation, and is constructed with the fewer number of components and assembly steps at a lower cost.

Incidentally, the air vent valve according to the present invention is not limited to the above-mentioned embodiment. For example, the shapes and structures of the case member 2, the check valve unit 3, and the cut valve unit 4 may be properly changed. Also, the respective parts may be assembled in the case member to constitute the check valve portion and the cut valve portion without unitizing the check valve portion and the cut valve portion as units. There is no problem even if the other structures are changed.

The air vent mechanism of the invention using the air vent valve is also not limited to the above-described embodiment, and various modifications may be made. For example, the other cut valves a may be provided at positions more than two in addition to the air vent valve according to the present invention depending on a type of the vehicle or a shape of the fuel tank t. The other cut valves may be connected to the tank side connecting portion of the air vent valve of the invention to constitute an air vent mechanism. In this case, a plurality of the pipings of the other cut valves may be connected to the tank side connecting portion of the air vent valve of the invention. Also, a plurality of tank side connection portions may be provided in the air vent valve of the present invention.

As described above, according to the air vent valve 1 and the air vent mechanism of the invention, the air vent mechanism with the simple piping performs the reliable air vent operation, and is constructed with the fewer number of components and assembling steps at a lower cost.

While the invention has been explained with reference to the specific embodiments of the invention, the explanation is illustrative and the invention is limited only by the appended claims.

What is claimed is:

1. A composite type air vent valve situated between a canister and a fuel tank, comprising:
   a check valve having a first tank side port and a first atmosphere side port for opening and closing a connection between the first tank side port and the first atmosphere side port according to an inner pressure of the fuel tank;
   a cut valve having a second tank side port and a second atmosphere side port, said cut valve generally opening a connection between the second tank side port and the second atmosphere side port to discharge vapor in the fuel tank and closing the connection between the second tank side port and the second atmosphere side port according to a fuel liquid level in the fuel tank; and
   a case member attachable on an outer surface of the fuel tank, said case member comprising:
   an atmosphere side connecting portion to be connected to the canister and communicating with the first atmosphere side port of the check valve;
   a communicating path for communicating the first tank side port of the check valve with the second atmosphere side port of the cut valve;
   a tank side connecting portion to be connected to another cut valve and communicating with the communicating paths;
   a check valve-attaching portion communicating with the atmosphere side connecting portion for retaining the check valve therein; and
   a cut valve-attaching portion disposed under the check valve-attaching portion for retaining the cut valve therein.

2. A composite type air vent valve as claimed in claim 1, wherein said check valve includes a check valve case having a lower end provided with the first tank side port, an upper end provided with the first atmosphere side port, and a check valve seat formed at an inner peripheral edge of the first atmosphere side port; a valve member disposed in the check valve case to be movable vertically and including a hollow body having a lower end in a funnel shape with a lower opening, and an upper end having a valve head with an upper opening; a valve ball disposed in the valve member for closing the lower opening; and an urging device situated under the valve member for urging the valve member upward to close the first atmosphere side port.

3. A composite type air vent valve as claimed in claim 2, wherein said valve member, valve ball and urging means are arranged such that normally, the lower opening is closed by the valve ball, and the valve member is located at an upper moving limit by the urging device to close the first atmosphere side port; when a pressure at the first tank side port becomes a predetermined high pressure, a space is formed between the lower end wall and the valve ball to communicate the first tank side port with the first atmosphere side port through the upper and lower openings of the valve member; and when a pressure at the first tank side port becomes a predetermined reduced pressure, the valve member is moved downward against the urging force of the urging device to thereby communicate the first tank side port with the first atmosphere side port.

4. A composite type air vent valve as claimed in claim 1, wherein said cut valve includes a cut valve case having a lower end provided with the second tank side port, an upper end provided with the second atmosphere side port, and a cut valve seat formed at an inner peripheral edge of the second atmosphere side port; and a floating member disposed in the cut valve case to be movable vertically and having a valve head at an upper end thereof so that the floating member rises to close the second atmosphere side port only when fuel enters the cut valve case portion.

5. An air vent mechanism comprising a fuel tank, the composite type air vent valve as claimed in claim 1 and attached to the fuel tank, at least one cut valve attached to the fuel tank and connected to the tank side connecting portion of the composite type air vent valve, and a canister connected to the atmosphere side connecting portion.

6. An air vent mechanism as claimed in claim 5, wherein said at least one cut valve includes a third tank side port and a third atmosphere side port, said at least one cut valve opening a connection between the third tank side port and the third atmosphere side port to discharge a vapor in the fuel tank in a normal state and closing the connection between the third tank side port and the third atmosphere side port when a fuel liquid surface in the fuel tank exceeds a predetermined level, said at least one cut valve projecting into the fuel tank through an attaching hole formed in the fuel tank when the at least one cut valve is attached to the fuel tank.

7. An air vent mechanism as claimed in claim 5, wherein said at least one cut valve further includes a cut valve case having a lower end provided with the third tank side port, an upper end provided with the third atmosphere side port, and a cut valve seat formed at an inner peripheral edge of the third atmosphere side port; and a floating member disposed in the cut valve case to be movable vertically and having a valve head at an upper end thereof so that the floating member rises to close the third atmosphere side port only when fuel enters the cut valve case portion.

8. A composite type air vent valve as claimed in claim 1, wherein said check valve is installed in the check valve-attaching portion as one unit, and the cut valve is installed in the cut valve-attaching portion as one unit, said check valve and said cut valve defining said communicating path therebetween.

9. A composite type air vent valve as claimed in claim 8, wherein said case member further includes an arc-shaped partition to form the check valve-attaching portion and a semicircular arc-shaped space between said check valve-attaching portion and an inner peripheral surface of said case member.

10. A composite type air vent valve as claimed in claim 9, wherein said semicircular arc-shaped space communicates the tank side connecting portion with the communicating path.

11. A composite type air vent valve as claimed in claim 9, wherein said check valve includes, as one unit, a check valve case having a lower end provided with the first tank side port, an upper end provided with the first atmosphere side port, and a check valve seat formed at an inner peripheral edge of the first atmosphere side port; a valve member disposed in the check valve case to be movable vertically and including a hollow body having a lower end in a funnel shape with a lower opening, and an upper end having a valve head with an upper opening; a valve ball disposed in the valve member for closing the lower opening; and an urging device situated under the valve member for urging the valve member upward to close the first atmosphere side port, and said cut valve includes, as one unit, a cut valve case having a lower end provided with the second tank side port, an upper end provided with the second atmosphere side port, and a cut valve seat formed at an inner peripheral edge of the second atmosphere side port; and a floating member disposed in the cut valve case to be movable vertically and having a valve head at an upper end thereof so that the floating member rises to close the second atmosphere side port only when fuel enters the cut valve case portion.

* * * * *